United States Patent
Barker

(10) Patent No.: US 7,830,869 B2
(45) Date of Patent: Nov. 9, 2010

(54) ESTABLISHING CONNECTION ACROSS A CONNECTION-ORIENTED FIRST TELECOMMUNICATIONS NETWORK IN RESPONSE TO A CONNECTION REQUEST FROM A SECOND TELECOMMUNICATIONS NETWORK

(75) Inventor: Andrew James Barker, Attenborough (GB)

(73) Assignee: Ericsson AB, Stockholm (SE)

( * ) Notice: Subject to any disclaimer, the term of this patent is extended or adjusted under 35 U.S.C. 154(b) by 1748 days.

(21) Appl. No.: 10/469,802

(22) PCT Filed: Mar. 6, 2002

(86) PCT No.: PCT/GB02/00994

§ 371 (c)(1),
(2), (4) Date: Mar. 26, 2004

(87) PCT Pub. No.: WO02/073879

PCT Pub. Date: Sep. 19, 2002

(65) Prior Publication Data

US 2005/0036484 A1    Feb. 17, 2005

(30) Foreign Application Priority Data

Mar. 9, 2001 (GB) .................. 0105891.6

(51) Int. Cl.
*H04L 12/28* (2006.01)
(52) U.S. Cl. .............. 370/389; 370/244; 370/392; 370/400; 370/408; 370/902
(58) Field of Classification Search ............. 370/244, 370/389, 392, 400, 401, 402, 408, 902, 907
See application file for complete search history.

(56) References Cited

U.S. PATENT DOCUMENTS 6,068,661 A * 5/2000 Shari ..................... 703/27

(Continued)

FOREIGN PATENT DOCUMENTS

EP    0 883 324 A2    12/1998

(Continued)

OTHER PUBLICATIONS

*Multiprotocol Label Switching in AM Networks*; Goran Hagard, et al., Ericsson Review No. 1, 1998, pp. 32-39.

(Continued)

*Primary Examiner*—Ayaz R Sheikh
*Assistant Examiner*—Andrew C Lee
(74) *Attorney, Agent, or Firm*—Kirschstein, et al.

(57) ABSTRACT

A first multi protocol label switching (MPLS) enabled Internet Protocol (IP) data network is able to transmit data to a second MPLS enabled IP network via a legacy optical network, which would not otherwise be able to handle the user network interface (UNI) protocols required to be used within an MPLS network environment, by means of configuring the legacy optical network and its traditional network management system (TNMS) so that they simulate or emulate an MPLS enabled optical network. The simulation/emulation of an MPLS network is performed as follows: when a first legacy network element (NE) receives a connection request (a UNI request) from the MPLS network under a UNI protocol, the UNI request is passed to the TNMS, which then sets the required connection across the legacy network via a second edge NE to an NE of the second IP network. Once the connection has been set, the TNMS instructs the edge NE to send a return signal to the requesting network indicating that the connection has been successfully set. Data packets may then be transmitted across the network.

15 Claims, 4 Drawing Sheets

U.S. PATENT DOCUMENTS

| | | | | |
|---|---|---|---|---|
| 6,078,596 | A * | 6/2000 | Wellbrock | 370/352 |
| 6,108,304 | A | 8/2000 | Abe et al. | |
| 6,108,309 | A * | 8/2000 | Cohoe et al. | 370/241 |
| 6,115,382 | A * | 9/2000 | Abe | 370/395.3 |
| 6,167,028 | A * | 12/2000 | Harris | 370/230 |
| 6,192,402 | B1 * | 2/2001 | Iwase | 709/223 |
| 6,260,062 | B1 * | 7/2001 | Davis et al. | 709/223 |
| 6,292,485 | B1 * | 9/2001 | Trotta et al. | 370/389 |
| 6,512,745 | B1 * | 1/2003 | Abe et al. | 370/232 |
| 6,522,629 | B1 * | 2/2003 | Anderson, Sr. | 370/236 |
| 6,539,432 | B1 * | 3/2003 | Taguchi et al. | 709/227 |
| 6,563,794 | B1 * | 5/2003 | Takashima et al. | 370/236 |
| 6,564,341 | B1 * | 5/2003 | Sundaram et al. | 714/43 |
| 6,597,689 | B1 * | 7/2003 | Chiu et al. | 370/354 |
| 6,678,474 | B1 * | 1/2004 | Masuda et al. | 398/75 |
| 6,711,171 | B1 * | 3/2004 | Dobbins et al. | 370/400 |
| 6,751,660 | B1 * | 6/2004 | Mansingh et al. | 709/223 |
| 6,765,921 | B1 * | 7/2004 | Stacey et al. | 370/401 |
| 6,775,288 | B1 * | 8/2004 | Tooker et al. | 370/395.2 |
| 6,795,439 | B2 * | 9/2004 | Watanabe et al. | 370/395.2 |
| 6,804,196 | B1 * | 10/2004 | Kadengal | 370/230 |
| 6,891,793 | B1 * | 5/2005 | Suzuki et al. | 370/217 |
| 7,010,615 | B1 * | 3/2006 | Tezuka et al. | 709/246 |
| 7,013,084 | B2 * | 3/2006 | Battou et al. | 398/45 |
| 7,020,696 | B1 * | 3/2006 | Perry et al. | 709/223 |
| 7,046,680 | B1 * | 5/2006 | McDysan et al. | 370/396 |
| 7,054,557 | B1 * | 5/2006 | Dasylva et al. | 398/48 |
| 7,168,044 | B1 * | 1/2007 | Mao | 715/736 |
| 7,197,546 | B1 * | 3/2007 | Bagga et al. | 709/223 |
| 2001/0033550 | A1 * | 10/2001 | Banwell et al. | 370/254 |
| 2001/0033570 | A1 * | 10/2001 | Makam et al. | 370/373 |
| 2002/0059274 | A1 * | 5/2002 | Hartsell et al. | 707/100 |
| 2002/0141342 | A1 * | 10/2002 | Furman et al. | 370/235 |
| 2004/0179531 | A1 * | 9/2004 | Bi et al. | 370/395.2 |
| 2005/0259571 | A1 * | 11/2005 | Battou | 370/217 |

FOREIGN PATENT DOCUMENTS

| | | |
|---|---|---|
| EP | 0 915 594 A2 | 5/1999 |
| EP | 1 026 867 A2 | 8/2000 |

OTHER PUBLICATIONS

Framework for MPLS-Based Control of Optical SDH/Sonet Networks, http://tools.ietf.org/html/draft-bms-optical-sdhsonet-mpls-control-frmwrk-00, Greg Bernstein, et al., Nov. 2000, pp. 1-27.

* cited by examiner

ESTABLISHING CONNECTION ACROSS A CONNECTION-ORIENTED FIRST TELECOMMUNICATIONS NETWORK IN RESPONSE TO A CONNECTION REQUEST FROM A SECOND TELECOMMUNICATIONS NETWORK

BACKGROUND OF THE INVENTION

The present invention relates to a method of communicating across a telecommunications network and associated apparatus. In particular, the invention relates to a method of communicating across a telecommunications network, to a telecommunications network, to a network management system for setting connections in a network and to a network element of such networks.

Telecommunications networks, particularly optical networks, have in the past routed data across the network by setting routes by means of a manually operated network management system. When changes are required to be made to the route or routes set in the network, response times can be very long in comparison to the rate of transmission of data.

Significant improvements in routing of data have been made in recent years in the context of electrical networks. One such improvement is the ability of network elements of the network to route data packets without reverting to a separate network management system. Recently, the use of Multi Protocol Label Switching (MPLS), which is currently used in both IP and ATM networks, has been recognised as being particularly advantageous. One of the benefits of MPLS is that network elements of the network are able to route a given data packet quickly, by reference to a label in the data packet. Furthermore, since the routing of data packets does not require the exchange of data with a network management system the use of MPIS has a major advantage in that it facilitates dynamic network control without the delays often associated with networks controlled by a network management system.

It has been proposed, so as to facilitate dynamic network control, to introduce MPLS, in the form of a Generalised Multi-protocol Label Switching (GMPLS) method, into optical networks. However, incorporating GMPLS into an optical network is not straightforward. Two proposals have been made for implementing GMPLS in an optical network as will now be described.

The first proposal may be referred to as the "Peer-to-Peer Model" and is illustrated by FIG. 1 of the accompanying drawings. With reference to FIG. 1, a first IP network 1 is connected via an optical network 2 to a second IP network 3. The optical network 2 is required to make available to the IP networks 1, 3 topological information (in the form of IP information) so that data packets can be routed from the first IP network 1 to the second IP network 3 via the optical network 2 by means of IP data in the data packet. If the optical network 2 is privately owned, making such topological information publicly available may however be undesirable. For example, such information may be considered to be commercially sensitive and it may be desired to keep such information confidential.

The second proposal, which may be referred to as the "Client-Server Model", does not require the optical network to make public such topological information. In this second proposal, which is described with reference to FIG. 2 of the accompanying drawings, a first IP network 1 is connected via an optical network 2 to a second IP network 3 in a manner similar to that of the first proposal. However, in this proposal the interfaces between the first and second IP networks 1, 3 (the clients) and the optical network 2 (the server) each include a user network interface 4 (UNI). Thus the first IP network 1, via a first UNI 4a, effectively request a connection across the optical network 2 by means of IP data in a data packet. Topology information relating to the optical network 2 is however not made available outside the optical network 2.

Both of the proposals described above suffer from a significant disadvantage. In order for the optical network to operate in a GMPLS environment it is necessary, in the proposals made, for the network elements of the optical network to process and handle network topology information and to set up and tear down network connections. In order for the individual network elements to be able to perform such tasks the network elements each require significant processing capability and access to significant amounts of memory. Whilst such requirements can be met when installing new optical networks, many existing optical network elements are not able to perform at the required level. Replacing such existing optical networks (often referred to as legacy networks) would be costly and is therefore undesirable.

BRIEF SUMMARY OF THE INVENTION

It is therefore an object of the present invention to provide a method of communicating across a telecommunications network which allows a given protocol, for example a protocol used in an MPLS environment, to be used in combination with other networks, for example optical networks, and which mitigates one or more of the problems associated with the above-mentioned proposals. The present invention also seeks to provide suitable means or apparatus for performing such a method or aspects of such a method.

According to a first aspect of the invention there is provided a method of operating a connection-oriented communications network, the communications network comprising a plurality of network elements in which connections across the network elements are established by a network management system; the communications network being connectable to a second communications network by an edge network element, the second communications network comprising a plurality of network elements each of which is capable of making connections or routing data across the second network in accordance with a connection request received by the element; the connection request being in accordance with a predetermined protocol, the method being for establishing a connection across the connection-oriented network in response to a connection request from the second network and characterized by: the edge network element upon receiving a connection request from the second network, sending to the network management system information relating to the connection request; the network management system sending signals to set a connection across the network in response to said information received from the edge network element; and the network management system causing the edge network element to send a return signal according to the predetermined protocol to the second network indicating the status of the setting of a connection.

The method of the present invention enables a connection-oriented network to establish connections in response to connection requests, which it would otherwise be unable to handle, by the steps of passing the connection request from a suitably configured edge network element to a suitably configured network management system, which is able to process the request, make the connection in accordance with the request and respond via the edge network element in accordance with the given protocol. As far as the second network is concerned the connection-oriented communications network is able to communicate with it under the given protocol. In the context of the method of the invention, the manner in which connection requests are made can be considered as being a client-server arrangement, in which the connection-oriented network is the server network and the second network is the client network.

The return signal indicating the status of the setting of the connection may for example indicate either that the connection has been successfully made or that the connection could not be made. After the second network receives a return signal indicating that the connection has been successfully made, data can then be transmitted from the second network across the communications network.

Advantageously the connection-oriented communications network is further connectable to a third communications network by a further edge network element, the third network comprising a plurality of network elements each of which is capable of making connections or routing data across the third network in accordance with a connection request received by the element, and the method further comprises: the network management system causing the further edge network element to send a connection request according to the predetermined protocol to the third network thereby enabling connection of the second and third networks via the connection-oriented network.

Preferably the connection-oriented network is operated such that, in use, topology information relating to the network is not made available outside the network to for example the second and/or third networks. Of course, information concerning the possible connections to and from network elements within, but at the edge of the network, may be made available to network elements outside the communications network and accordingly such information may be considered as not relating to topology information relating to the communications network.

Advantageously the predetermined protocol is a user network interface (UNI protocol The UNI protocol may be such that topology information is not revealed over the interface between the communications networks. The user network interface protocol used may, for example, be in accordance with the standards laid down by the Optical Interface Forum (OIF). An appropriate standard is described in document number OIF 2000.125 available from the Optical Interface Forum. In the case where the communications network is connected to MPLS enabled networks, the arrangement may be such that the MPLS network elements require a connection request in order to make a connection and transmit data. Such MPLS network elements may also be arranged automatically to send appropriate connection requests. Thus, when setting a connection from the communications network to the third network that is MPLS enabled, the network management system advantageously causes the further edge network element to send an appropriate connection request, for example, a UNI request.

The method may be such that other protocols are used when further connection requests are made between network elements of the network. For example, a network network interface (or NNI) protocol may be used. An NNI protocol may be especially convenient when connection requests are made between MPLS enabled network elements. The NNI protocol may be such that topology information is revealed over the interface between the relevant network elements.

According to a second aspect of the invention there is provided a connection-oriented communications network comprising a plurality of network elements in which connections across the network elements are established by a network management system; the communications network being adapted to be interoperable with a second communications network by an edge network element, the second network comprising a plurality of network elements each of which is capable of making connections or routing data across the second network in accordance with a connection request received by the element; the connection request being in accordance with a predetermined protocol, the connection-oriented network being characterized by the edge network element upon receiving connection request from the second network, sending to the network management system information relating to the connection request; the network management system sending signals to the network elements to set a connection across the network in response to said information received from the edge network element; and the network management system causing the edge network element to send a return signal according to the predetermined protocol to the second network indicating the status of the setting of a connection.

The present invention finds particular application to legacy connection-oriented networks that comprise network elements unable to make connections or route data in accordance with connection requests. The step in which the edge network element sends to the network management system information relating to the connection request can comprise relaying, or repeating, the connection request. The edge network element may therefore be required to perform little or preferably no processing of the connection request. Conveniently the edge network element can comprise a legacy edge network element that has been appropriately adapted. Conversion of the legacy network element may include a step of programming the network element with appropriate updated software. The requirements of such computer software will be apparent to the relevant persons skilled in the art and, as such, further details of such software are not provided here. Alternatively, the conversion could be made by means of extra hardware in addition to, or instead of, providing such software.

The network management system advantageously comprises the legacy network management system that has been appropriately adapted. The conversion of such a legacy network management system may include a step of programming the network management system with appropriate updated software. Again the requirements of such computer software would be apparent to those skilled in the art, when presented with the details of the present invention. Alternatively, the conversion could be made by means of extra hardware in addition to, or instead of, providing such software.

Advantageously the communications network further comprises a further edge network element for connecting the communications network to a third communications network, the third network comprising a plurality of network elements each of which is capable of making connections or routing data across the third network in accordance with a connection request received by the element, the network management system being configured to cause the further edge network element to send a connection request according to the predetermined protocol to the third network thereby enabling connection of the second and third networks via the communications network. Such a network is advantageous where the third network requires a connection request according to the predetermined protocol to be received before a connection can be made. Since the network management system causes the further edge network to send the connection request this eliminates the need for the further edge network element to be able to itself generate the connection request.

Preferably the communications network is operated such that, in use, topology information relating to the network is not made available outside the network.

Advantageously the predetermined protocol is a user network interface (UNI) protocol. The network management system may also be able to handle that some UNI protocol insofar as is necessary to enable it to cause the edge network element to send the return signal under the same UNI protocol. The relevant edge network elements of the network may simply be programmed with appropriate software to enable them to handle the same UNI protocol.

Preferably the second and/or third networks are packet based networks, such as Internet Protocol (IP) networks in which data packets are routed by the network elements in dependence upon the connection request within the packets. Alternatively the second and/or third networks can comprise Asynchronous Transfer Mode (ATM networks, and alike, in which connections are established by the network elements in dependence upon connection requests. The invention finds particular application for connection to networks able to handle Multi-Protocol Label Switching (MPLS). It will be understood that multi-protocol label switching may take many forms, any of which could be used in the context of the present invention. For example, a generalised form of MPLS (GMPLS) may be used The form of multi-protocol label switching used may however be conveniently chosen to be in accordance with an accepted standard, for example a standard set by the Internet Engineering Task Force.

According to a farther aspect of the invention there is provided an edge network element for use in a communications network in accordance with the second aspect of the invention.

According to a yet further aspect of the invention there is provided a network management system for use in a communications network in accordance with the second aspect of the invention.

BRIEF DESCRIPTION OF THE DRAWINGS

Embodiments of the present invention will now be described by way of example only with reference to the accompanying schematic drawings, of which:

FIGS. 1 and 2 relate to prior art proposal and are described above.

DETAILED DESCRIPTION OF THE PREFERRED EMBODIMENTS

Figure 1:
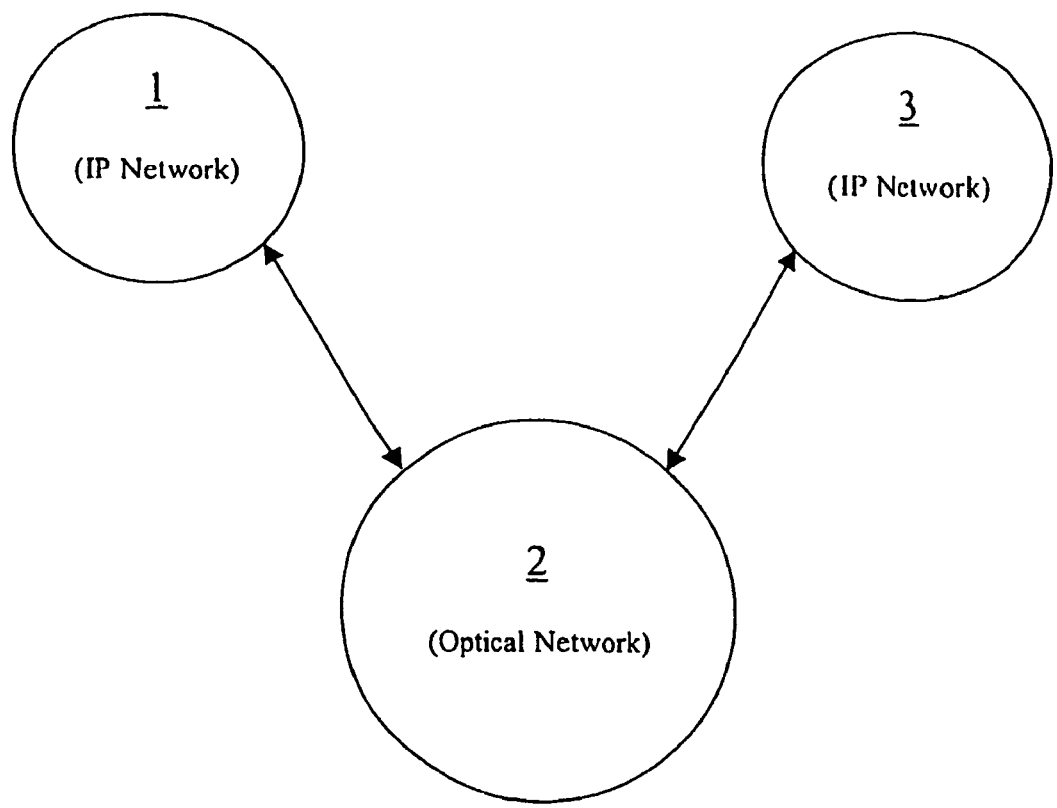
FIGS. 1 and 2 show prior art proposals for a telecommunications network.
Figure 2:
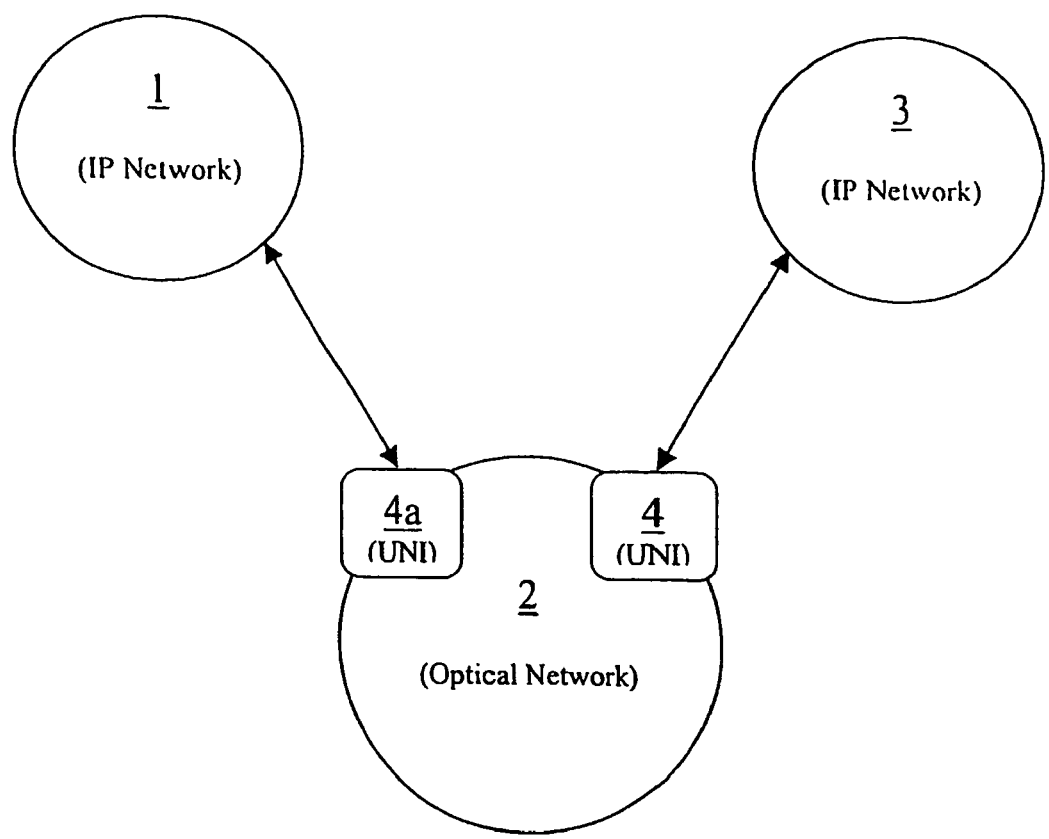
Figure 3:
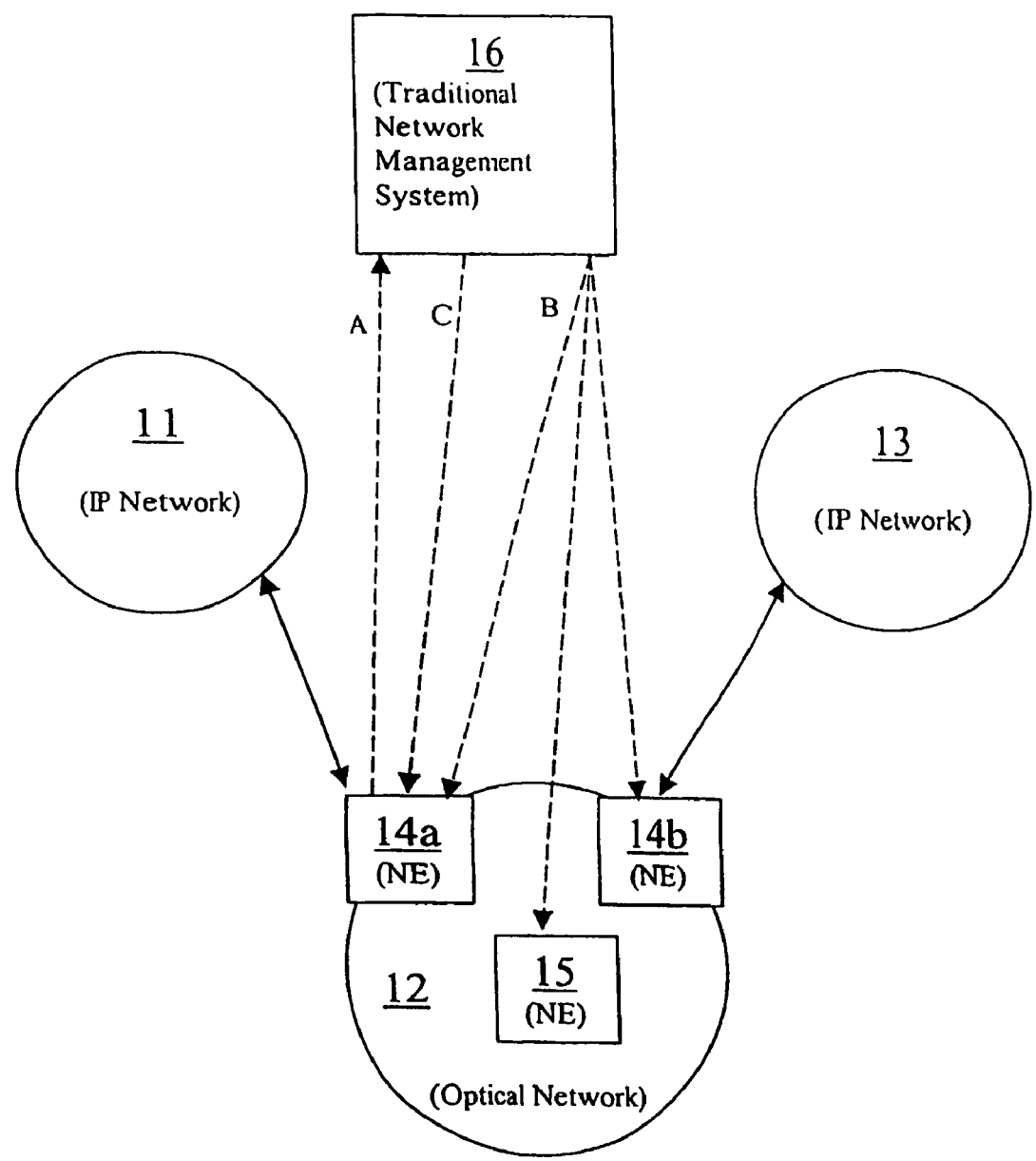
FIG. 3 illustrates a telecommunications network in accordance with a first embodiment of the invention.

A telecommunications network according to the first embodiment of the invention is shown in FIG. 3. With reference to FIG. 3 the network includes a first MPLS enabled IP network 11 connectable to a second MPLS enabled IP network 13 via a legacy optical network 12. The legacy optical network 12 includes a plurality of internal network elements 15 (only one of which is shown in FIG. 3 for the sake of clarity) and a plurality of edge network elements 14a, 14b (only two of which are shown). The legacy optical network 12 is also connected to a traditional network management system 16.

At the interface between the first IP network 11 and the optical network 12, signals may be received and sent by an edge network element 14a of the optical network 12. Similarly, at the interface between the second IP network 13 and the optical network 12, signals may be received and sent by an edge network element 14b of the optical network 12. Network access and connection requests may be made through the edge network elements of the optical network. The network may thus be considered as forming a client/server system with interfaces, between the server (the optical network 12) and the client (the first or second IP networks 11, 13).

The protocol used at such interfaces, in relation to the provision of network access and connection requests, is a UNI (user network interface) protocol.

A UNI protocol is also used throughout the first and second IP networks 11, 13 and connection requests in the form of UNI requests are, in the IP networks, processed by the local network elements, connections being established by use of the topology protocols running across the network. The topology protocols used may for example be an OSPF (Open Shortest Path First) protocol. However, the network elements within the legacy optical network 12 are not able to process such requests locally. The making of a connection across the optical network 12, including the handling of UNI requests made to edge network elements of the optical network 12, will now be described.

A UNI request is sent to a first edge network element 14a of the optical network 12 from a network element (not shown separately) of the first IP network 11, the request effectively requesting a connection to a network element of the second WP network 13. The request is sent (arrow A) directly to the network management system 16. The network management system 16 then processes the request and determines an appropriate connection across the optical network 12. The network management system 16 then sends signals (arrows B) instructing the edge network element 14a, the relevant internal network elements 15 and a second network element 14b of the optical network to establish the required connection. The network management system 16 then formulates a suitable response for sending to the network element of the first network 11 that sent the UNI request. The network management system 16 then sends (arrow C) a signal to the edge network element 14a originally receiving the UNI request, causing that edge network element 14a to send such a suitable response to that network element of the first network 11.

The response sent from the edge network element 14a originally receiving the UNI request to the network element of the first network 11 indicates either that a connection has been successfully made or that the connection failed, as appropriate. If the connection is successfully made the network element of the first network 11 is then able to send data via the optical network 12 to the appropriate network element of the second IP network 13.

The IP networks 11, 13 are not able to discover the topology of the optical network 12, as such information is not made available outside of the optical network 12.

Thus it will be appreciated that such an arrangement enables a client/server UNI network to be established without the need for network elements of the server network (the legacy optical network 12) to run locally any topology protocols. This is especially advantageous in legacy networks, such as the optical network 12 illustrated in FIG. 3, where the network elements do not have the required memory and/or processing power to handle such protocols.

A telecommunications network according to a second embodiment of the invention is illustrated with reference to FIG. 4. In this second embodiment, MPLS enabled network elements are combined with legacy network elements in a common transport network. The MPLS enabled parts of the network can operate with full topology protocols, whereas the legacy part of the network effectively emulates a UNI interface to enable connections across the legacy part of the network to be provided automatically on request.

Figure 4:
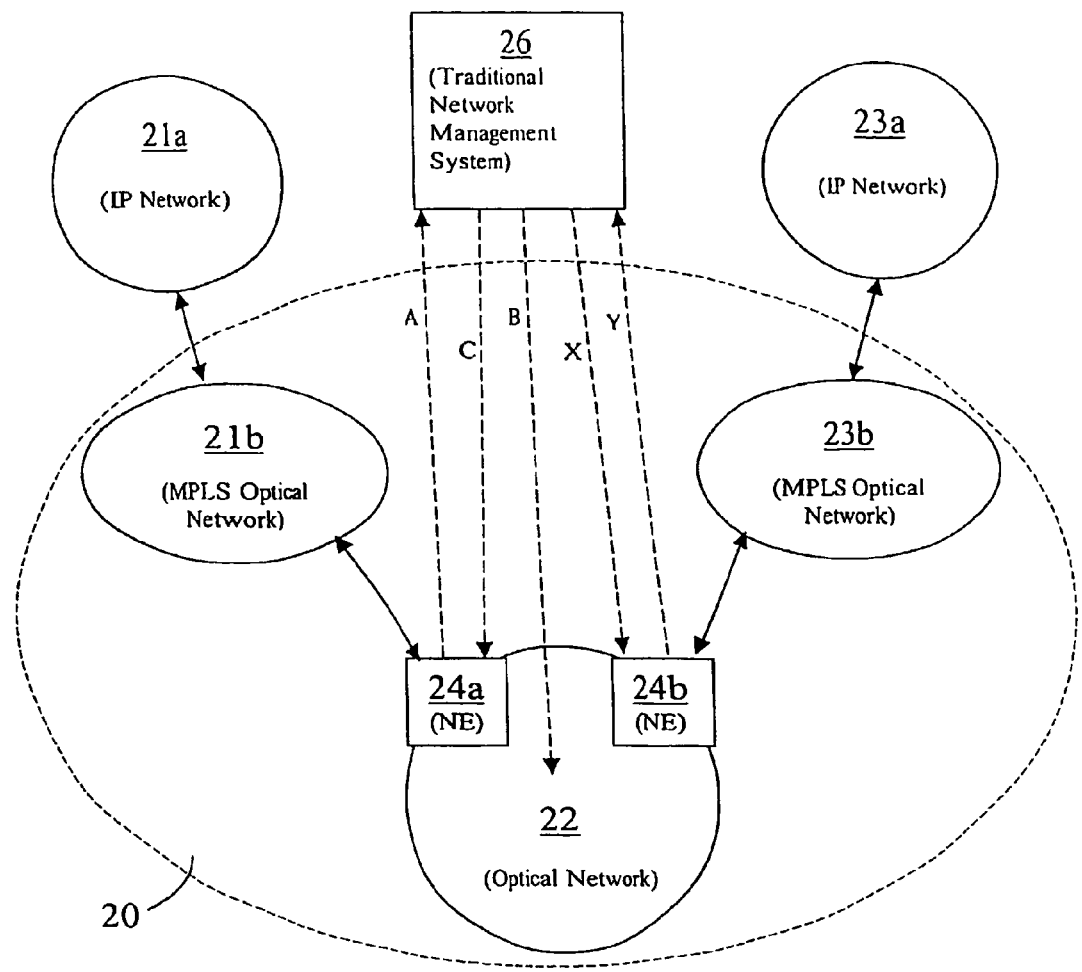
FIG. 4 illustrates a telecommunications network in accordance, with a second embodiment of the invention.

With reference to FIG. 4, the network includes a first MPLS enabled IP network 21a connectable to a second MPLS enabled IP network 23a via an optical network 20. The optical part of the network comprises a legacy optical network 22 connectable between first and second MPLS enabled optical networks 21b, 23b. The legacy optical network 22 includes a plurality of internal network elements (not shown) and a plurality of edge network elements 24a, 24b and is connected to a traditional network management system 26, in a manner similar to that of the legacy optical network 12 shown in FIG. 3.

In FIG. 4, the first IP network 21a has a UNI interface to the optical network 20. Topology information relating to the first MPLS optical network 21b, the second MPLS optical network 23b and the legacy optical network 22 is not made available outside each network, respectively. As far as the first IP network 21a is concerned the optical network 20 may, or may not, be separated into MPLS enabled and legacy optical networks. The making of a connection from the first IP network 21a to the second IP network 23a will now be described.

The first IP network 21a sends a UNI request to the first MPLS enabled optical network 211b of the optical network 20, the UNI request effectively, requesting a connection to a network element (not shown separately) of the second IP network 23a via the optical network 20. The UNI request is processed locally within the first MPLS optical network 21b, and the requested connection made to the edge of that network, where it meets another UNI interface (the interface between the first MPLS optical network 21b and the legacy optical network 22). A new UNI request is therefore sent from an edge network element of the first MPLS optical network 21b to a first edge network element 24a of the legacy optical network 22. This UNI request effectively requests a connection from the interface between the MPLS optical network 21b and the legacy optical network 22 to the destination network element of the second IP network 23a. Since the network receiving the UNI request is a legacy optical network 22, the request cannot be processed locally by the network elements of the network 22.

In a manner similar to that described above with reference to the first embodiment, the request is sent (arrow A) directly to the traditional network management system 26. The network management system 26 then processes the request and determines an appropriate connection across the optical network 22. The network management system 26 then sends signals (arrow B) instructing the edge network element 24a, the relevant internal network elements and a second network element 24b of the optical network to establish the required connection. In this embodiment, however, the legacy optical network 22 interfaces to another optical network, which is MPLS enabled (i.e. the second MPLS optical network 23b).

The second MPLS optical network 23b requires a UNI request to cause it to make the connection to the second IP network 23a. Thus the network management system 26 sends (arrow X) to the second edge network element 24b of the legacy network 22 a signal causing the second edge network element 24b to send a UNI request to an edge network element of the second MPLS optical network 23b. This UNI request again effectively requests a connection to be made to the destination network element of the second IP network 23a. The UNI request is processed locally within the second MPLS optical network 23b, and the requested connection made across that network to the destination network element of the second IP network 23a.

The edge network element of the second MPLS optical network 23b receiving the UNI request from the second edge network element 24b of the legacy network 22, sends a return signal under the UNI protocol to the second edge network element 24b, the return signal indicating that the requested connection has been successfully made. The return signal is sent (arrow Y) directly to the network management system 26. On receipt of that return signal the network management system 26 formulates a suitable response for sending to the network element of the first MPLS optical network 21b that sent the UNI request to the legacy network 22. The network management system 26 then sends (arrow C) a signal to the edge network element 24a originally receiving the UNI request from the first MPLS optical network 21b, causing that edge network element 24a to send such a suitable response under the UNI protocol to the relevant edge network element of the first MPLS optical network 21b.

The indication of the successful connection is then finally relayed to the first IP network 21a by the first MPLS optical network 21b to complete the connection process. The network element of the first IP network 21a is then able to send data via the optical, network 20 to the appropriate network element of the second IP network 23a. Should the process fail at any stage, then a failure response is sent back to the requesting network. The network is arranged such that on such a failure any intermediate connections that have been made in relation to the given connection request are cleared down.

As will be appreciated, various modifications may be made to the above described embodiments. For example, two IP networks could be connected via an optical network, such that a first IP network is connected to a single MPLS optical network, which is connected to a single legacy network, which is connected to a second IP network. In such a case, the receipt from the first network of a UNI request requesting connection to the second IP network would be handled in a similar manner to that described with reference to the first embodiment. The UNI request passed on by the MPLS optical network would be passed from an ingress legacy network element to the network management system of the legacy network, which would set a connection across the legacy network to the second IP network, and then cause the ingress legacy network element to send an appropriate response to the requesting IP network, data thereafter being transmitted from the first IP network across the optical network and to the second IP network.

Also, two IP networks could be connected via an optical network, such that a first IP network is connected to a single legacy network, which is connected to a single MPLS optical network, which is connected to a second IP network. In such a case, the receipt from the first network of a UNI request requesting connection to the second IP network would be handled in a similar manner to that described with reference to the second embodiment. The UNI request would be passed from an ingress legacy network element to the network management system of the legacy network, which would set a connection, send a UNI request via an egress legacy network element to the MPLS optical network, receive an appropriate response via the egress legacy network element from the MPLS optical network, and then cause the ingress legacy network element to send an appropriate response to the requesting IP network, data thereafter being transmitted from the first IP network across the optical network and to the second IP network.

Other permutations of legacy optical, optical MPLS, and IP networks will of course be apparent to those skilled in the art.

Whilst MPLS optical networks have been referred to above, the embodiments described would of course also be of use if the MPLS optical networks were in the form of GMPLS (generalised MPLS) optical networks.

The IP based networks described above need not be IP data networks and could alternatively be ATM data networks, since such networks may also be used with MPLS and user network interfaces (UNI)

The topology protocols used across the MPLS networks need not be OSPF. For example, the topology protocol used may alternatively be an IS/IS (Intermediate System to Intermediate System Routing Exchange) protocol from the OSI (Open Systems Interconnection).

The invention claimed is:

1. A method of operating a connection-oriented first communications network having a plurality of first network elements in which connections across the first network elements are established by a network management system, the first network being connectable to a second communications network by an edge network element, the second network having a plurality of second network elements each operative for making connections or routing data across the second network in accordance with a connection request received by the edge network element, the connection request being in accordance with a predetermined protocol, the method being performed to establish a connection across the connection-oriented first network in response to the connection request from the second network, and comprising the steps of:

a) upon the edge network element receiving the connection request from the second network, sending to the network management system information relating to the connection request;

b) sending signals by the network management system to set the connection in response to said information received from the edge network element; and c) causing the edge network element by the network management system to send a return signal according to the predetermined protocol to the second network indicating a status of a setting of the connection.

2. The method according to claim 1, wherein the connection-oriented first network is further connectable to a third communications network by a further edge network element, the third network having a plurality of third network elements each operative for making connections or routing data across the third network in accordance with a connection request received by the further edge network element, the method further comprising the step of: causing the further edge network element by the network management system to send a connection request according to the predetermined protocol to the third network, thereby enabling a connection of the second and third networks via the connection-oriented first network.

3. The method according to claim 1, and comprising the step of operating the connection-oriented first network such that, in use, topology information relating to the first network is not made available outside the first network.

4. The method according to claim 1, wherein the predetermined protocol is a user network interface (UNI) protocol.

5. A connection-oriented first communications network, comprising: a plurality of first network elements in which connections across the first network elements are established by a network management system, the first communications network being interoperable with a second communications network by an edge network element, the second network having a plurality of second network elements each operative for making connections or routing data across the second network in accordance with a connection request received by the edge network element, the connection request being in accordance with a predetermined protocol, the edge network element upon receiving the connection request from the second network, being operative for sending to the network management system information relating to the connection request, the network management system being operative for sending signals to the first network elements to set a connection in response to said information received from the edge network element, and the network management system being operative for causing the edge network element to send a return signal according to the predetermined protocol to the second network indicating a status of a setting of the connection.

6. The connection-oriented first communications network according to claim 5, and further comprising a further edge network element for connecting the first network to a third communications network having a plurality of third network elements each operative for making connections or routing data across the third network in accordance with a connection request received by the further edge network element, the network management system being configured to cause the further edge network element to send the connection request according to the predetermined protocol to the third network, thereby enabling the connection of the second and third networks via the first network.

7. The connection-oriented first communications network according to claim 5, wherein the first network is operated such that, in use, topology information relating to the first network is not made available outside the first network.

8. The connection-oriented first communications network according to claim 5, wherein the predetermined protocol is a user network interface (UNI) protocol.

9. The connection-oriented first communications network according to claim 5, wherein the first network is an optical communications network.

10. The connection-oriented first communications network according to claim 5, wherein the second network elements of the second network are operative for establishing connections or routing data in accordance with multi-protocol label switching (MPLS).

11. A method of operating a first communications network having a plurality of first network elements and a network management system, wherein connections across the first network elements are established by the network management system, the first network being connectable to a second communications network by an edge network element, the second network having a plurality of second network elements each operative for making connections or routing data across the second network in accordance with a connection request received by the edge network element, wherein the first and second networks use different switching or routing techniques, the connection request being in accordance with a predetermined protocol, the method being performed to establish a connection across the first network in response to the connection request from the second network, and comprising the steps of:

a) the network management system receiving information relating to the connection request from the edge network element;

b) the network management system sending signals to set the connection in response to said information received from the edge network element; and c) the network management system sending a signal to the edge network element to cause the edge network element to send a return signal according to the predetermined protocol to the second network indicating a status of a setting of the connection.

12. The method according to claim 11, wherein a connection request is made in a client-server arrangement, in which the first communications network is a server network and the second network is a client network.

13. The method according to claim 11, wherein the first communications network is a connection-oriented network.

14. An edge network element for use in a connection-oriented first communications network having a plurality of first network elements in which connections across the first network elements are established by a network management system, the edge network element being characterized in that:
the edge network element is operative for connecting the first communications network to a second communications network having a plurality of second network elements,
the edge network element is operative for receiving a connection request in accordance with a predetermined protocol, each of the plurality of second network elements being operative for making connections or routing data across the second communications network in accordance with the connection request,
wherein the edge network element is, in order to establish a connection across the connection-oriented first network, configured to receive the connection request from the second communications network, and to send information relating to the connection request to the network management system, and to receive a signal from the network management system, and the received signal causing the edge network element to send a return signal, according to the predetermined protocol to the second communications network, indicating a status of a setting of the connection established by the network management system, and
wherein the connection is established by the network management system sending signals to set the connection in response to information relating to the connection request received from the edge network element.

15. A network management system, characterized in that:
the network management system establishes connections across a plurality of first network elements of a connection-oriented first communications network, the connection-oriented first communications network being connectable to a second communications network having a plurality of second network elements by an edge network element, each of the plurality of second network elements being operative for making connections or routing data across the second communications network in accordance with a connection request in accordance with a predetermined protocol received by the edge network element,
wherein the network management system is, in order to establish a connection across the connection-oriented first communications network, configured to receive information relating to the connection request from the edge network element, the edge network element receiving the connection request from the second communications network, and
wherein the network management system is further configured to send signals to set the connection in response to the received information, and to send a signal to the edge network element to cause the edge network element to send a return signal according to the predetermined protocol to the second communications network, and the return signal indicating a status of a setting of the connection.

* * * * *

UNITED STATES PATENT AND TRADEMARK OFFICE
CERTIFICATE OF CORRECTION

PATENT NO.         : 7,830,869 B2
APPLICATION NO.    : 10/469802
DATED              : November 9, 2010
INVENTOR(S)        : Barker Page 1 of 1

It is certified that error appears in the above-identified patent and that said Letters Patent is hereby corrected as shown below:

On the title page, item (75), under "Inventors", in Column 1, Line 1,
delete "Attenborough" and insert -- Nottingham --, therefor.

In Column 1, Line 35, delete "MPIS" and insert -- MPLS --, therefor.

In Column 3, Line 18, delete "touting" and insert -- routing --, therefor.

In Column 3, Line 37, delete "(UNI protocol The" and insert -- (UNI) protocol. The --, therefor.

In Column 5, Line 6, delete "some" and insert -- same --, therefor.

In Column 5, Line 17, delete "(ATM" and insert -- (ATM) --, therefor.

In Column 5, Line 25, delete "used" and insert -- used. --, therefor.

In Column 5, Line 27, delete "example" and insert -- example, --, therefor.

In Column 5, Line 29, delete "farther" and insert -- further --, therefor.

In Column 5, Lines 47-48, delete "accordance," and insert -- accordance --, therefor.

In Column 6, Line 29, delete "WP" and insert -- IP --, therefor.

In Column 7, Line 27, delete "211b" and insert -- 21b --, therefor.

In Column 8, Line 26, delete "optical," and insert -- optical --, therefor.

In Column 9, Line 10, delete "(UNI)" and insert -- (UNI). --, therefor.

Signed and Sealed this
First Day of November, 2011

David J. Kappos
*Director of the United States Patent and Trademark Office*